United States Patent [19]
Nakamura et al.

[11] Patent Number: 6,157,626
[45] Date of Patent: Dec. 5, 2000

[54] CELL SELECTION SCHEME FOR CDMA MOBILE COMMUNICATION SYSTEM USING PERCH CHANNEL TRANSMISSION ATTENUATION

[75] Inventors: Takehiro Nakamura; Etsuhiro Nakano, both of Yokosuka, Japan

[73] Assignee: NTT Mobile Communications Network Inc., Tokyo, Japan

[21] Appl. No.: 08/870,301

[22] Filed: Jun. 6, 1997

[30] Foreign Application Priority Data

Jun. 7, 1996 [JP] Japan ..................... 8-145904

[51] Int. Cl.[7] ................................. H04J 13/00
[52] U.S. Cl. .............................. 370/328; 370/342
[58] Field of Search .................. 370/328–338, 370/441, 442, 342, 347, 320, 311, 318, 288; 455/69, 403, 434, 455, 383, 516, 517, 524, 525, 526, 62, 560, 561, 562, 575; 375/130, 348

[56] References Cited

U.S. PATENT DOCUMENTS 5,056,109  10/1991  Gilhousen et al. ............... 374/59
5,513,246  4/1996   Jonsson et al. .................. 379/60
5,574,983  11/1996  Douzona et al. ................. 455/69
5,673,260  9/1997   Umeda et al. ................... 370/342

FOREIGN PATENT DOCUMENTS 0 615 353   9/1994  European Pat. Off. .
WO 97/29596 8/1997  WIPO .

*Primary Examiner*—Dang Ton
*Attorney, Agent, or Firm*—Oblon, Spivak, McClelland, Maier & Neustadt, P.C.

[57] ABSTRACT

A cell selection scheme for a CDMA mobile communication system which is capable of reducing an amount of interference power and thereby preventing the degradation of the system capacity. In this scheme, each base station transmits a perch channel which is spread by using a spread code assigned to each base station. Then, a mobile station receives more than one perch channels transmitted from more than one base stations, calculates a transmission attenuation value of each received perch channel, and judges a located cell according to calculated transmission attenuation values of these more than one perch channels.

8 Claims, 4 Drawing Sheets

CELL SELECTION SCHEME FOR CDMA MOBILE COMMUNICATION SYSTEM USING PERCH CHANNEL TRANSMISSION ATTENUATION

BACKGROUND OF THE INVENTION

1. Field of the Invention

The present invention relates to a cell selection scheme for a CDMA (Code Division Multiple Access) mobile communication system in which a plurality of base stations provided in respective cells transmit perch channels which are spread by using mutually different spread codes assigned to these base stations and each mobile station judges a located cell by receiving the perch channels.

2. Description of the Background Art

Here, a conventional cell selection method will be described for an exemplary case of using the conventional digital mobile communication system called PDC (Personal Digital Cellular) system which is currently providing a mobile communication service in Japan.

In the conventional cell selection method, each one of a plurality of base stations provided in respective cells continuously transmits the perch channel at a constant transmission power. Here, the constant transmission power may be different at different base stations.

Then, in order to carry out a located cell judgement, the mobile station measures a receiving level of each perch channel transmitted from each base station, and judges that it is currently located in a cell of a base station which transmitted the perch channel with the largest receiving level.

FIG. 1 shows an exemplary relationship between a mobile station position and a perch channel receiving level. Here, it is assumed that the mobile station is located on a straight line joining two base stations, and in FIG. 1, a horizontal axis represents a position of the mobile station between these two base stations and a vertical axis represents a receiving level value for a perch channel from each base station at each position. Also, FIG. 1 shows an exemplary case in which the transmission powers used at the base station BS1 and the base station BS2 are different.

As shown in FIG. 1, the perch channel receiving level decreases exponentially as the mobile station moves away from the base station. Note that, in practice, the perch channel receiving level has more complicated minute variations due to the presence of attenuation factors other than a distance from the base station, but these other attenuation factors are ignored here for the sake of simplicity. When the mobile station is located at a position X, for example, the receiving level of the perch channel from the base station BS2 is greater than the receiving level of the perch channel from the base station BS1 so that the mobile station judges that it is currently located in a cell of the base station BS2.

When this conventional cell selection method is applied to the CDMA mobile communication system, the degradation of the system capacity will be caused for the following reasons, especially when the perch channel transmission powers are different at different base stations as in an exemplary case shown in FIG. 1.

FIG. 2 shows an exemplary relationship between a mobile station position and a transmission attenuation value. In FIG. 2, the horizontal axis represents a position of the mobile station between two base stations BS1 and BS2 and the vertical axis represents a transmission attenuation value. This relationship of FIG. 2 is applicable not only to the perch channel but also to the communication channels in both an upward direction (from a mobile station to a base station) and a downward direction (from a base station to a mobile station). As shown in FIG. 2, the transmission attenuation increases as the mobile station moves away from the base station. A value of the transmission attenuation depends on a distance from the base station regardless of which base station it is, so that the transmission attenuation value for the base station BS1 and the transmission attenuation value for the base station BS2 become equal at a midpoint between the base station BS1 and the base station BS2.

When the cell judgement according to the perch channel receiving level is carried out similarly as in the conventional cell selection method, the mobile station located at a position X will judge a cell of the base station BS2 as a located cell as described above. However, as can be seen from FIG. 2, the position X is located closer to the base station BS1 so that the transmission attenuation value for the base station BS1 is smaller than that for the base station BS2.

Now, in the CDMA mobile communication system, the system capacity is determined by an amount of interference power. In order to prevent a decrease of the system capacity, it is necessary to reduce an amount of interference power, and in order to reduce an amount of interference power, it is necessary to make the transmission power at the a transmitting side as small as possible within a limit of maintaining a required receiving quality at a receiving side. Then, in order to reduce the transmission power while maintaining the required receiving quality at a receiving side, it is necessary for the mobile station to carry out the communication with a base station which has the smallest transmission attenuation value.

In this regard, according to the conventional cell selection method, a cell of a base station with a larger transmission attenuation value can be judged as a located cell as in a case of the cell judgement at a position X of FIG. 1 and FIG. 2. Consequently, the transmission power will be increased when the communication between the mobile station and the base station is started in such a cell, and therefore there has been a problem that the degradation of the system capacity can be caused.

The above problem arises when the perch channel transmission powers are different at different base stations. However, in the current mobile communication service, there is a need to use a simplified base station especially in a case of providing micro-cells within a macro-cell or in a case of supporting an indoor communication, so that a use of such a simplified base station imposes a limitation on an available transmission power due to the base station equipment. When a presence of such a simplified base station is properly taken into consideration, it is expected that a situation in which the perch channel transmission powers are different at different base stations can be encountered quite frequently, so that this problem can be a serious problem in a case of realizing the current mobile communication service by using the CDMA scheme.

SUMMARY OF THE INVENTION

It is therefore an object of the present invention to provide a cell selection scheme for a CDMA mobile communication system which is capable of reducing an amount of interference power and thereby preventing the degradation of the system capacity.

In the present invention, the reduction of an amount of interference power is realized by carrying out the cell judgement according to the perch channel transmission attenuation.

According to one aspect of the present invention there is provided a method of cell selection in a CDMA mobile communication system in which a plurality of base stations are provided in respective cells and mutually different spread codes are assigned to said plurality of base stations, the method comprising the steps of: transmitting from each base station a perch channel which is spread by using a spread code assigned to each base station; receiving more than one perch channels transmitted from more than one base stations at a mobile station, calculating a transmission attenuation value of each received perch channel, and Judging a located cell according to calculated transmission attenuation values of said more than one perch channels.

According to another aspect of the present invention there is provided a base station apparatus for use in a CDMA mobile communication system in which a plurality of base stations are provided in respective cells and mutually different spread codes are assigned to said plurality of base stations, the base station apparatus for one base station comprising: a first unit for transmitting a perch channel signal through a perch channel of said one base station which is spread by using a spread code assigned to said one base station; and a second unit for notifying a perch channel transmission power information for the perch channel of said one base station to a mobile station, where the perch channel transmission power information and a perch channel receiving level of the perch channel of said one base station at the mobile station are indicative of a transmission attenuation value of the perch channel of said one base station.

According to another aspect of the present invention there is provided a mobile station apparatus for use in a CDMA mobile communication system in which a plurality of base stations are provided in respective cells and mutually different spread codes are assigned to said plurality of base stations, the mobile station apparatus comprising: a first unit for receiving more than one perch channels transmitted from more than one base stations, the perch channel transmitted from each base station being spread by using a spread code assigned to each base station; a second unit for calculating a transmission attenuation value of each received perch channel; and a third unit for judging a located cell according to calculated transmission attenuation values of said more than one perch channels.

Other features and advantages of the present invention will become apparent from the following description taken in conjunction with the accompanying drawings.

DETAILED DESCRIPTION OF THE PREFERRED EMBODIMENTS

Figure 1:
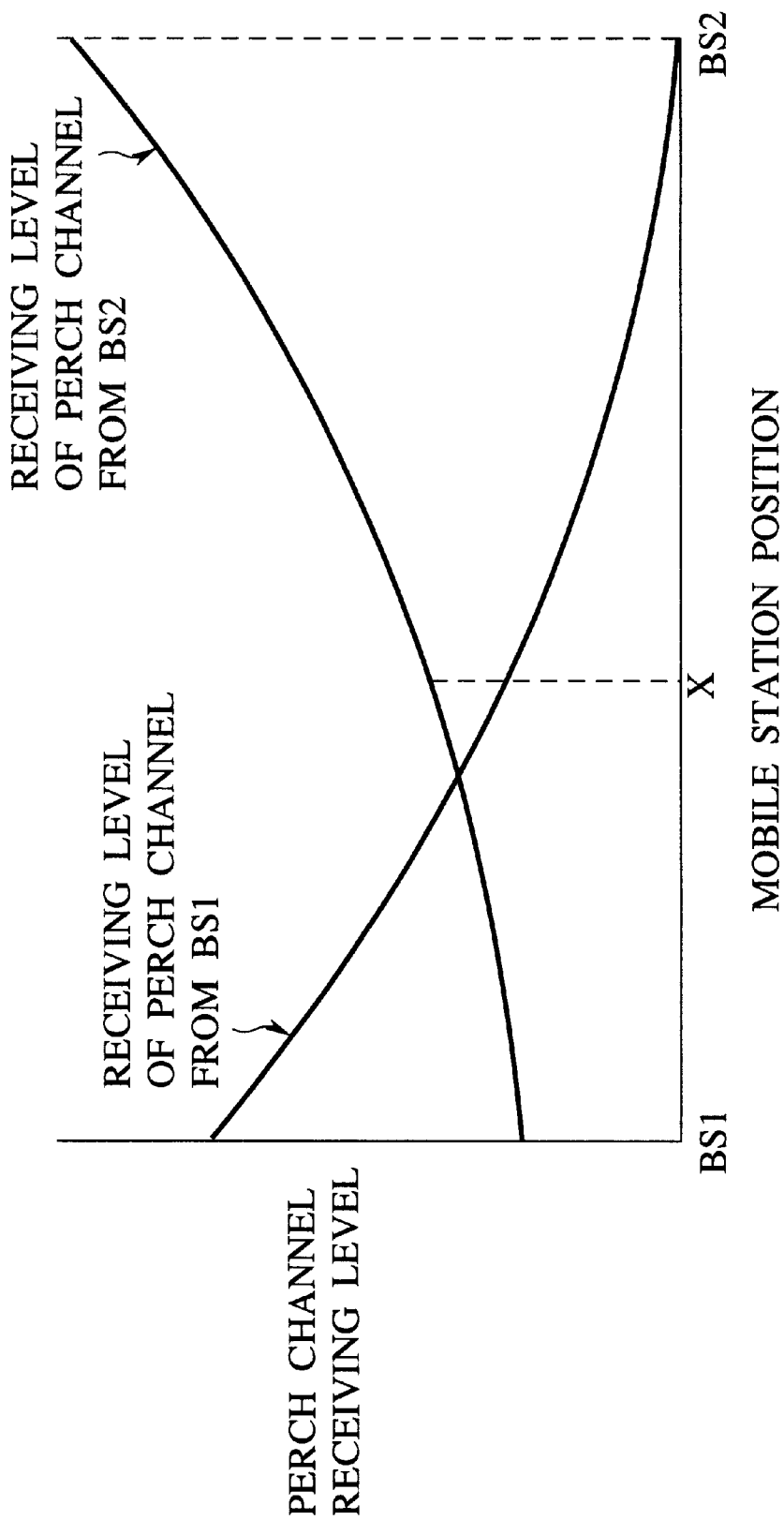
FIG. 1 is a graph showing an exemplary relationship between a mobile station position and a perch channel receiving level, for explaining a conventional cell selection method.
Figure 2:
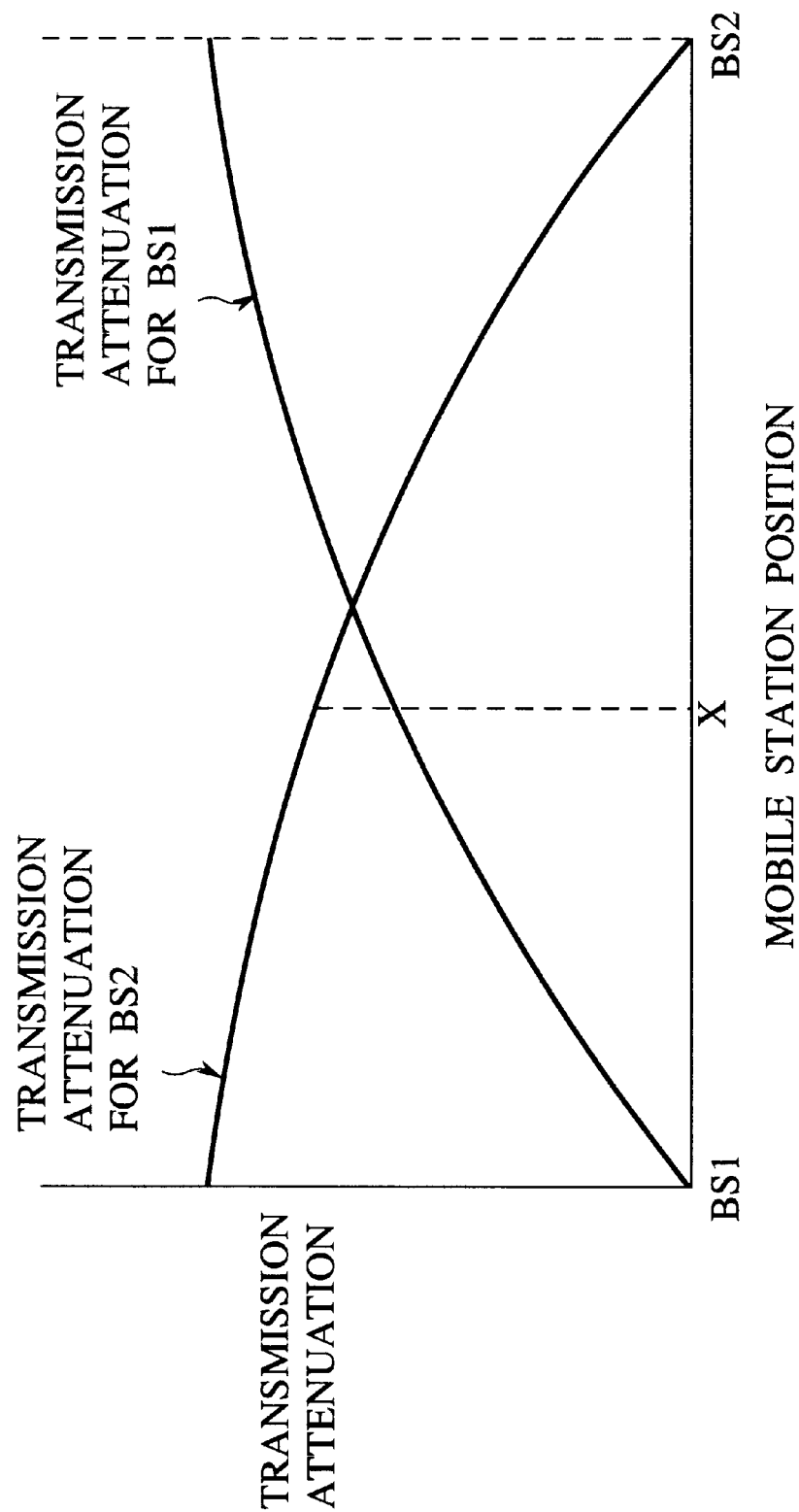
FIG. 2 is a graph showing an exemplary relationship between a mobile station position and a transmission attenuation value, for explaining a problem associated with a conventional cell selection method.
Figure 3:
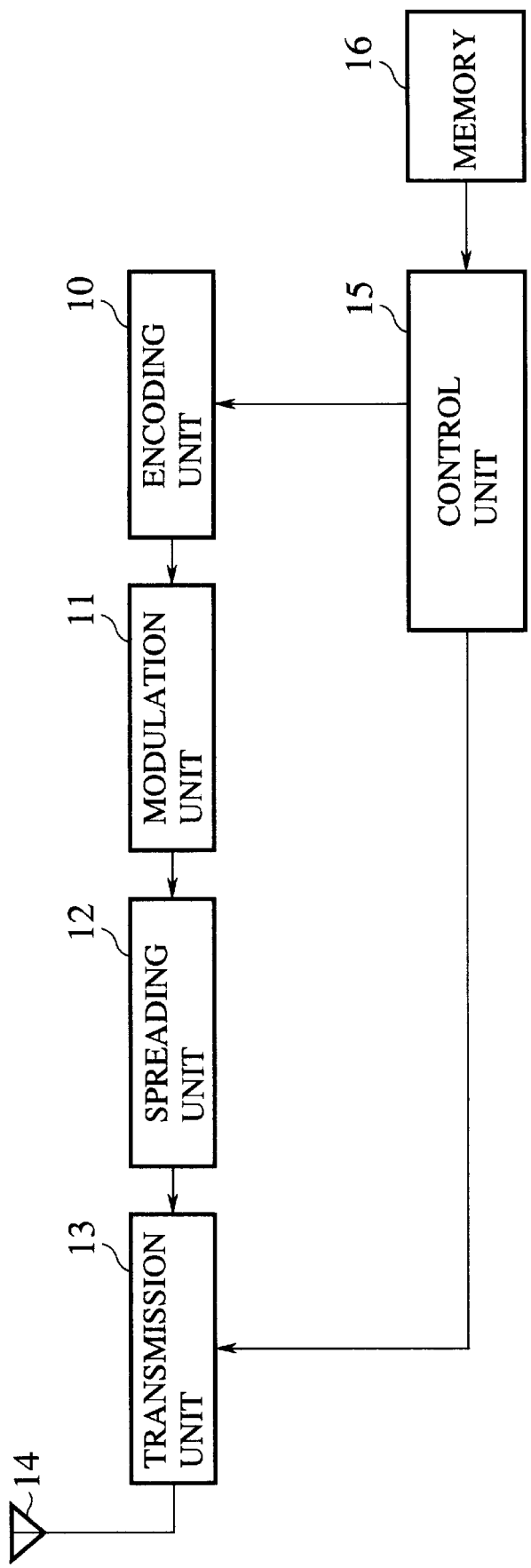
FIG. 3 is a block diagram showing an exemplary configuration of a mobile station apparatus for realizing one embodiment of the cell selection scheme according to the present invention.
Figure 4:
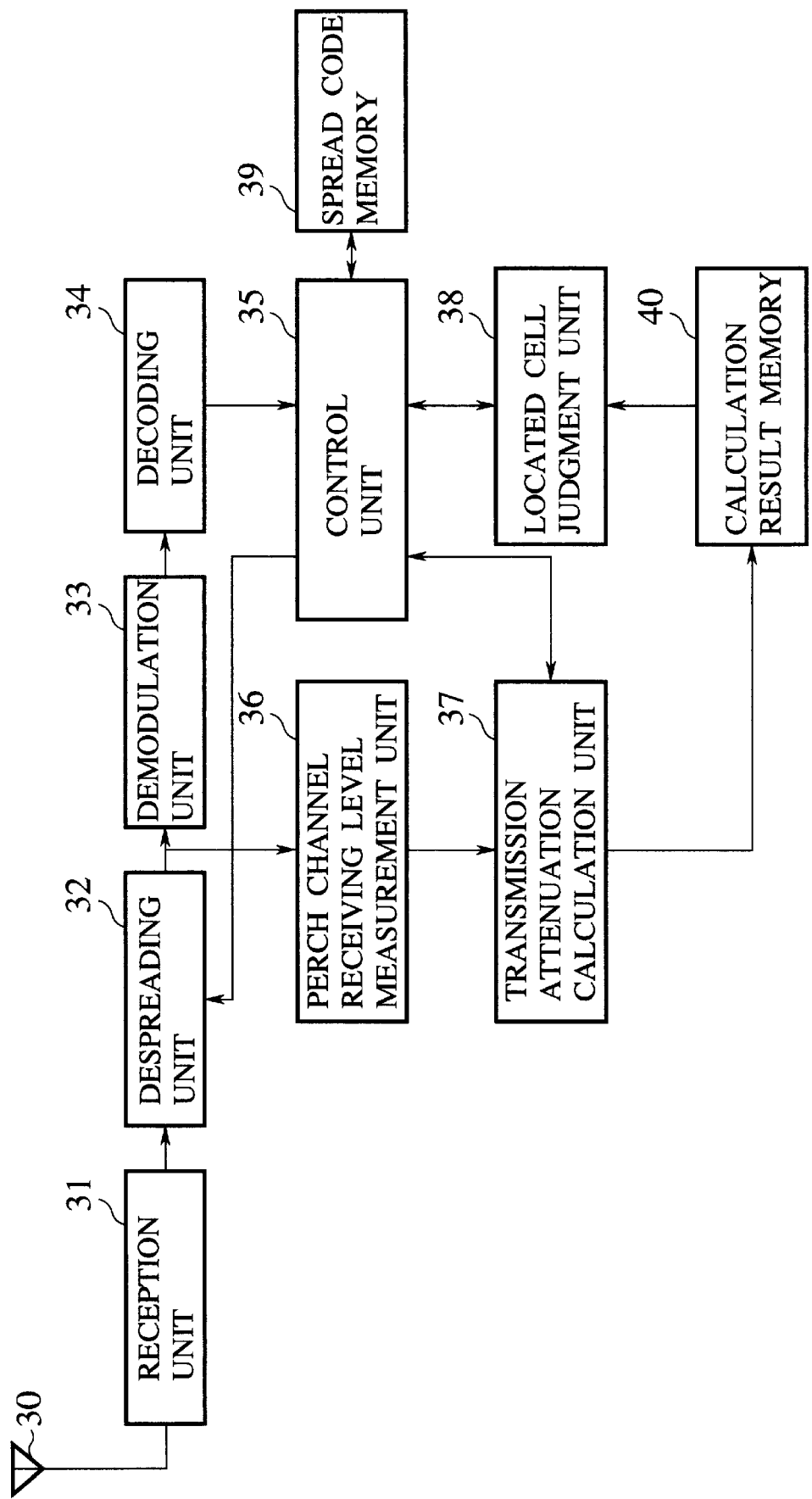
FIG. 4 is a block diagram showing an exemplary configuration of a base station apparatus for realizing one embodiment of the cell selection scheme according to the present invention.

Referring now to FIG. 3 and FIG. 4, one embodiment of a cell selection scheme for a CDMA mobile communication system according to the present invention will be described in detail.

FIG. 3 shows an exemplary configuration of a base station apparatus for realizing the cell selection scheme in this embodiment, which comprises: a control unit 15 for carrying out an overall control of the base station; an encoding unit 10 for encoding a control data from the control unit 15; a modulation unit 11 for modulating the encoded signal obtained by the encoding unit 10; a spreading unit 12 for spreading the modulated signal obtained by the modulation unit 11; a transmission unit 13 for generating RF signal by frequency converting the spread signal obtained by the spreading unit 12 and amplifying the obtained RF signal so as to satisfy a transmission power value specified from the control unit 15; an antenna 14 from which the amplified RF signal obtained by the transmission unit 13 is transmitted; and a memory 16 for storing a perch channel transmission power information for this base station.

FIG. 4 shows an exemplary configuration of a mobile station apparatus for realizing the cell selection scheme in this embodiment, which comprises: an antenna 30; a reception unit 31 for applying various processings such as an amplification, a frequency conversion into IF signal, a detection, a frequency conversion into baseband signal, etc., with respect to a signal received by the antenna 30, and generating a received digital signal; a despreading unit for despreading the received digital signal obtained by the reception unit 31; a demodulation unit 33 for demodulating the despread signal obtained by the despreading unit 32; a decoding unit 34 for decoding the demodulated signal obtained by the demodulation unit 33; a control unit 35 for carrying out an overall control of the mobile station; a perch channel receiving level measurement unit 36 for measuring a receiving level of the perch channel; a transmission attenuation calculation unit 37 for calculating a transmission attenuation value of the perch channel from a perch channel receiving level obtained by the perch channel receiving level measurement unit 37 and a perch channel transmission power information notified from the control unit 35; a located cell Judgement unit 38 for making a located cell judgement according to a perch channel transmission attenuation value obtained by the transmission attenuation calculation unit 37; a spread code memory 39 for storing a plurality of perch channel spread codes; and a calculation result memory 40 for storing a plurality of perch channel transmission attenuation value calculation results obtained by the transmission attenuation calculation unit 37.

In the base station apparatus of FIG. 3, the control reads out the perch channel transmission power information for this base station from the memory 16, and notifies this information to the transmission unit 13. In addition, the control unit 15 supplies the control data to the encoding unit 10, where the control data also contains this perch channel transmission power information. Then, the encoding unit 10 encodes the supplied control data, the modulation unit 11 modulates the encoded signal, and the spreading unit 12 spreads the modulated signal and supplies the spread signal to the transmission unit 13. Then, the transmission unit 13 carries out the frequency conversion with respect to the supplied spread signal so as to generate the RF signal, amplifies the generated RF signal according to the perch channel transmission power information notified from the control unit 15, and transmits the amplified RF signal as the perch channel through the antenna 14.

In the mobile station apparatus of FIG. 4, the perch channel transmission attenuation value is calculated for each one of a plurality of received perch channels. First, a method for calculating the perch channel transmission attenuation value for one perch channel will be described.

At the mobile station, the spread codes of all the perch channels which are expected to be used for the cell Judgement are stored in the spread code memory 39 in advance. The control unit 35 reads out one perch channel spread code from the spread code memory 39 and supplies the read out spread code to the despreading unit 32. On the other hand, a signal received by the antenna 30 is converted into a digital signal at the reception unit 31, and the received digital signal is supplied to the despreading unit 32.

The despreading unit 32 despreads the received digital signal supplied from the reception unit 31 by using the spread code supplied from the control unit 35, so as to extract a perch channel signal. The extracted perch channel signal is then demodulated by the demodulation unit 33 and decoded by the decoding unit 34, and the decoded signal is supplied to the control unit 35. Then, the control unit 35 extracts the perch channel transmission power information contained in the decoded signal, and notifies this received perch channel transmission power information and a perch channel spread code identification number to the transmission attenuation calculation unit 37.

In addition, the perch channel signal extracted at the despreading unit 32 is also supplied to the perch channel receiving level measurement unit 36. At the perch channel receiving level measurement unit 36, the receiving level of the received perch channel is measured, and the measured receiving level value is supplied to the transmission attenuation calculation unit 37.

The transmission attenuation calculation unit 37 calculates the perch channel transmission attenuation value according to the measured perch channel receiving level value and the received perch channel transmission power information supplied from the control unit 35. The transmission attenuation calculation unit 37 then stores the calculation result into the calculation result memory 49 in correspondence to the perch channel spread code identification number, and notifies the completion of the perch channel transmission attenuation calculation to the control unit 35.

The control unit 35 then reads out another perch channel spread code for a next perch channel to be processed, and repeat the above described processing for this next perch channel. This processing is repeated until all the perch channel transmission attenuation value calculation results are stored in the calculation result memory 40 for all the perch channel spread codes stored in the spread code memory 39.

After the completion of the perch channel transmission, attenuation calculation for the last perch channel is received from the transmission attenuation calculation unit 37, the control unit 35 commands the located cell judgement unit 38 to make the located cell Judgement.

In response, the located cell Judgement unit 38 makes accesses to the calculation result memory 40, selects one perch channel transmission attenuation value calculation result which has the smallest value among a plurality of perch channel transmission attenuation value calculation results stored in the calculation result memory 40, and reads out the perch channel spread code identification number corresponding to the selected perch channel transmission attenuation value calculation result from the calculation result memory 40. The located cell Judgement unit 38 then Judges a cell of a base station which transmitted the perch channel corresponding to this read out perch channel spread code identification number as a located cell, and notifies this read out perch channel spread code identification number to the control unit 35 as a judgement result.

The control unit 35 then carries out the subsequent control based on the cell judgement result by regarding a cell of a base station which transmitted the perch channel corresponding to the notified perch channel spread code identification number as the located cell.

In this embodiment, the perch channel transmission power information can be given in a form of an effective isotropic radiated power (EIRP) value of an antenna.

In such a case, the memory 16 of the base station apparatus stores the EIRP value for the perch channel to be transmitted from that base station. The control unit 15 then reads out the EIRP value from the memory 16, and supplies the read out EIRP value to the encoding unit 10 and the transmission unit 13. The transmission unit 13 then amplifies the RF signal so that the EIRP value at the antenna 14 satisfies the EIRP value supplied from the control unit 15.

Also, in the mobile station apparatus, the control unit 35 supplies the EIRP value contained in the decoded signal obtained by the decoding unit 34 to the transmission attenuation calculation unit 37. Then, the transmission attenuation calculation unit 37 calculates the transmission attenuation value as:

$$TAV = EIRPV / PCRL$$

where TA is the transmission attenuation value, EIRPV is the EIRP value, and PCRL is the perch channel receiving level, and stores the calculation result in the calculation result memory 40.

As described, according to the present invention, the mobile station judges the located cell according to the transmission attenuation of the perch channel, so that even when the perch channel transmission powers are different at different base stations in the CDMA mobile communication system, it is possible for the mobile station to select the base station which has the smallest transmission attenuation value by carrying out the cell judgement according to the perch channel transmission attenuation. Consequently, it is possible for the mobile station to carry out communications in both an upward direction and a downward direction with the base station which has the smallest transmission attenuation value, so that the transmission power can be minimized, an amount of interference power can be reduced, and the degradation of the system capacity can be prevented.

The cell selection scheme according to the present invention is expected to be indispensable in a situation where the perch channel transmission powers are different at different base stations in the CDMA mobile communication system, from a viewpoint of the system capacity. Such a situation can be encountered when an overlay arrangement of a macro-cell and micro-cells is adopted. Namely, a micro-cell base station has a limitation on an available transmission power in view of the power consumption and the equipment size, so that the transmission power of a micro-cell base station may very well be smaller than that of a macro-cell base station. Similarly, in a case using both an indoor base station and an outdoor base station, the transmission power of an indoor base station may very well be smaller than that of an outdoor base station.

This kind of situation is expected to be encountered very frequently in conjunction with the recent spread of the mobile communication service, and the cell selection scheme according to the present invention is expected to be quite effective in a case of using the CDMA scheme in the mobile communication system in future.

It is to be noted that, in the embodiment described above, the perch channel transmission power information is notified to the mobile station by containing the perch channel transmission power information in the perch channel, but it is also possible to notify the perch channel transmission power information to the mobile station by containing the perch channel transmission power information in a radio channel other than the perch channel.

For example, the base station which is currently in communication with the mobile station can notify the perch channel transmission power information for the perch channel of the own station as well as the perch channel transmission power information for the perch channels of the neighboring base stations through a radio channel used for the communication. It is also possible for each base station to notify the perch channel transmission power information for the perch channel of the own station as well as the perch channel transmission power information for the perch channels of the neighboring base stations through a control radio channel other than the perch channel. In the latter case, each base station may notify the perch channel transmission power information for the perch channel of the own station as well as the perch channel transmission power information for the perch channels of the neighboring base stations through this control radio channel, to each mobile station which is currently located within a cell of this base station and receiving this control radio channel while being in a communication waiting state.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method of cell selection in a CDMA mobile communication system in which a plurality of base stations are provided in respective cells and mutually different spread codes are assigned to said plurality of base stations, the method comprising the steps of:

transmitting from each base station a perch channel which is spread by using a spread. code assigned to each base station;

receiving more than one perch channels transmitted from more than one base stations at a mobile station, calculating a transmission attenuation value of each received perch channel, and judging a located cell according to calculated transmission attenuation values of said more than one perch channels; and notifying from each base station to the mobile station a perch channel transmission power information for each perch channel transmitted from each base station;

wherein the mobile station calculates the transmission attenuation value of each received perch channel from a notified perch channel transmission power information for each received perch channel and a perch channel receiving level of each received perch channel.

2. The method of claim 1, wherein the mobile station judges a cell of a base station which transmitted a perch channel with a smallest transmission attenuation value among said more than one perch channels, as the located cell.

3. The method of claim 1, wherein the perch channel transmission power information is given in a form of an effective isotropic radiated power (EIRP) value of an antenna, and the mobile station calculates the transmission attenuation value as:

$$TAV = EIRPV/PCRL$$

where TA is the transmission attenuation value, EIRPV is the EIRP value, and PCRL is the perch channel receiving level.

4. A base station apparatus for use in a CDMA mobile communication system in which a plurality of base stations are provided in respective cells, mutually different spread codes are assigned to said plurality of base stations, and a mobile station judges a located cell by measuring a transmission attenuation value of each perch channel transmitted by each base station, the base station apparatus for one base station comprising:

a first unit for transmitting a perch channel signal through a perch channel of said one base station which is spread by using a spread code assigned to said one base station; and a second unit for notifying a perch channel transmission power information for the perch channel of said one base station to the mobile station, where the perch channel transmission power information and a perch channel receiving level of the perch channel of said one base station at the mobile station are indicative of the transmission attenuation value of the perch channel of said one base station.

5. The base station apparatus of claim 4, wherein the perch channel transmission power information is given in a form of an effective isotropic radiated power (EIRP) value of an antenna.

6. A mobile station apparatus for use in a CDMA mobile communication system in which a plurality of base stations are provided in respective cells and mutually different spread codes are assigned to said plurality of base stations, the mobile station apparatus comprising:

a first unit for receiving more than one perch channels transmitted from more than one base stations, the perch channel transmitted from each base station being spread by using a spread code assigned to each base station;

a second unit for calculating a transmission attenuation value of each received perch channel; and a third unit for judging a located cell according to calculated transmission attenuation values of said more than one perch channels;

wherein a perch channel transmission power information for the perch channel transmitted from each base station is notified from each base station, and the second unit calculates the transmission attenuation value of each received perch channel from a notified perch channel transmission power information for each received perch channel and a perch channel receiving level of each received perch channel.

7. The mobile station apparatus of claim 6, wherein the third unit judges a cell of a base station which transmitted a perch channel with a smallest transmission attenuation value among said more than one perch channels, as the located cell.

8. The mobile station apparatus of claim 6, wherein the perch channel transmission power information is given in a form of an effective isotropic radiated power (EIRP) value of an antenna, and the second unit calculates the transmission attenuation value as:

$$TAV = EIRPV/PCRL$$

where TA is the transmission attenuation value, EIRPV is the EIRP value, and PCRL is the perch channel receiving level.

* * * * *